(12) United States Patent
Clarke et al.

(10) Patent No.: US 7,333,480 B1
(45) Date of Patent: Feb. 19, 2008

(54) LOCALIZATION OF CALL ROUTING FOR TDM SETS IN AN IP NETWORK

(75) Inventors: Gwen Clarke, Belleville (CA); Cuthbert Cheung, Belleville (CA); Peter Tarle, Belleville (CA); Percy Lau, Carrying Place (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 674 days.

(21) Appl. No.: 10/945,148

(22) Filed: Sep. 20, 2004

(51) Int. Cl.
*H04L 12/66* (2006.01)

(52) U.S. Cl. .................. 370/352; 370/356; 370/401

(58) Field of Classification Search ............... 370/351, 370/352, 353, 354, 355, 356, 400, 401, 389
See application file for complete search history.

(56) References Cited

U.S. PATENT DOCUMENTS

| | | | | |
|---|---|---|---|---|
| 2003/0133450 | A1* | 7/2003 | Baum | 370/389 |
| 2004/0057425 | A1* | 3/2004 | Brouwer et al. | 370/352 |
| 2005/0190892 | A1* | 9/2005 | Dawson et al. | 379/37 |
| 2005/0213716 | A1* | 9/2005 | Zhu et al. | 379/45 |
| 2006/0188073 | A1* | 8/2006 | Wright | 379/45 |
| 2006/0227942 | A1* | 10/2006 | Binning | 379/45 |
| 2007/0103317 | A1* | 5/2007 | Zellner et al. | 340/573.1 |
| 2007/0121799 | A1* | 5/2007 | Binning | 379/37 |
| 2007/0142060 | A1* | 6/2007 | Moton et al. | 455/456.1 |

* cited by examiner

*Primary Examiner*—Ajit Patel
(74) *Attorney, Agent, or Firm*—Ridout & Maybee LLP

(57) ABSTRACT

A system and method for routing calls from a time-division multiplexed (TDM) sets in an IP network to a geographically appropriate portion of the public switched telephone network (PSTN). A call is routed to an edge gateway in a geographic location corresponding to the geographic location of an IP media gateway to which the TDM set is connected. Each IP media gateway is associated with a geographic zone. Each geographic zone is also associated with at least one edge gateway. Accordingly, incoming calls are routed by the central call server based upon the geographic zone associated with the IP media gateway receiving the call, and are routed to an edge gateway associated with the identified geographic zone. The system and method may be applied to route emergency service access calls to an appropriate portion of the PSTN so that they arrive at a geographically appropriate public service answering point (PSAP).

26 Claims, 2 Drawing Sheets

LOCALIZATION OF CALL ROUTING FOR TDM SETS IN AN IP NETWORK

FIELD OF THE APPLICATION

This invention relates to call routing and, in particular, to localization of call routing for time-division multiplexed (TDM) phones in an IP network.

BACKGROUND OF THE INVENTION

Modern telecommunications networks often employ IP networks to route data and voice traffic. In many situations, an IP network for serving a number of users may be distributed over a wide geographic area, such that users are not necessarily in the same city, state, or even country. All of the voice call traffic may be routed and managed by a central call server in the IP network. The central call server may be in a different physical location from many of the terminals connecting to the IP network. Edge gateways connect the IP network to the PSTN, allowing calls originating in the IP network to reach termination points in the PSTN, and vice versa.

Traditional TDM sets, i.e. digital and analog sets that are not IP-enabled, are still used even in the context of IP networks for telephony. The IP network includes IP media gateways (IPMG) for connecting TDM sets to the network. The central call server manages the routing of calls from the IPMG to termination points.

In some circumstances, it would be desirable to base the call routing on the location of the TDM set.

For example, in the traditional public-switched telephone network (PSTN), an ESA call is placed over a physical circuit from a TDM phone to a private or public branch exchange or switch. The switch or exchange recognizes the nature of the ESA call, e.g. an E911 call in North America, and routes the call to the local public service answering point (PSAP). The TDM phone, the exchange or switch, and the PSAP are all co-located in the same general geographic area. Accordingly, a user calling 911 is assured of reaching a PSAP in his or her general area.

A difficulty that arises with ESA calls in an IP network configuration is that the central call server and the edge gateways may be located in different geographic regions from the user of the TDM set that places an ESA call. Accordingly, if the central call server simply routes an ESA call to an edge gateway, the call will enter the PSTN at a geographic location that may bear no relation to the geographic location of the caller. As a result the caller may be connected with a PSAP in a different city, state, or even country.

In another example, a TDM set may place a call to a PSTN location within the local area code of the TDM set, i.e. a local call. In some circumstances, the central call server may be located in another area code, i.e. in another city or state or country. As a result, the call from the TDM set may enter the PSTN at a location that would render the call a long-distance call through PSTN circuits.

SUMMARY OF THE APPLICATION

The present application describes a system and method for routing calls from TDM sets in an IP network to a geographically appropriate area of the PSTN. A call is routed to an edge gateway in a geographic location corresponding to the geographic location of the IPMG to which the TDM set is connected. Each IPMG is associated with a geographic zone. Each geographic zone is also associated with at least one edge gateway. Accordingly, an incoming call may be routed by the central call server based upon the geographic zone associated with the IPMG receiving the call, and is routed to an edge gateway associated with the identified geographic zone.

In one aspect, the present application provides a method of routing a call request from a time-division multiplexed (TDM) set, the TDM set being connected to an IP network through an IP media gateway, the IP network including a central call server for controlling the IP media gateway and routing calls in the IP network, the IP network including a plurality of edge gateways connecting the IP network to a public switched telephone network (PSTN). The method includes steps of receiving a signalling message at the central call server from the IP media gateway, the signalling message identifying a call from the TDM set, identifying a geographic zone associated with the IP media gateway, selecting one of the edge gateways based upon the geographic zone, and sending the IP media gateway routing information for routing the call to the selected edge gateway.

In a further aspect, the present application provides a system for routing a call request from a time-domain multiplexed (TDM) set through an IP network, the IP network including a plurality of edge gateways connecting the IP network to a public switched telephone network (PSTN). The system includes an IP media gateway connected to the TDM set and providing an interface to the IP network, and a central call server for controlling the IP media gateway and routing calls in the IP network. The central call server includes an input for receiving a signalling message from the IP media gateway, the signalling message identifying a call from the TDM set. The central call server includes a component for identifying a geographic zone associated with the IP media gateway, a component for selecting one of the edge gateways based upon the geographic zone, and a component for sending routing information to the IP media gateway for routing the call to the selected edge gateway.

In another aspect, the present application provides a central call server for routing a call request from a time-division multiplexed (TDM) set through an IP network, wherein the IP network includes a plurality of edge gateways connecting the IP network to a public switched telephone network (PSTN) and the IP network includes an IP media gateway connected to the TDM set and providing an interface to the IP network. The central call server includes an input for receiving a signalling message from the IP media gateway, wherein the signalling message identifies a call from the TDM set. The central call server also includes a component for identifying a geographic zone associated with the IP media gateway, a component for selecting one of the edge gateways based upon the geographic zone, and a component for sending routing information to the IP media gateway for routing the call to the selected edge gateway.

Other aspects and features of the present application will become apparent to those ordinarily skilled in the art upon review of the following description of specific embodiments in conjunction with the accompanying figures.

BRIEF DESCRIPTION OF THE DRAWINGS

Reference will now be made, by way of example, to the accompanying drawings which show an embodiment of the present application, and in which.

Similar reference numerals are used in the figures to denote similar components.

DESCRIPTION OF SPECIFIC EMBODIMENTS

Although embodiments of the invention described below are directed to the routing of emergency service access calls to an appropriate public service access point in the public switched telephone network, it will be appreciated that the present application is not limited to such embodiments. The routing of certain calls based upon the geographic location of the IP media gateway and/or TDM set is applicable in a wider range of scenarios. For example, a call from a TDM set to a PSTN phone terminal within the local geographic calling area of the PSTN may be purposely routed to enter the PSTN through an edge gateway in the geographic region of the IP media gateway so as to avoid establishing the call as a long-distance call across area codes. The method and system described below may also have application in other scenarios for routing calls.

Figure 1:
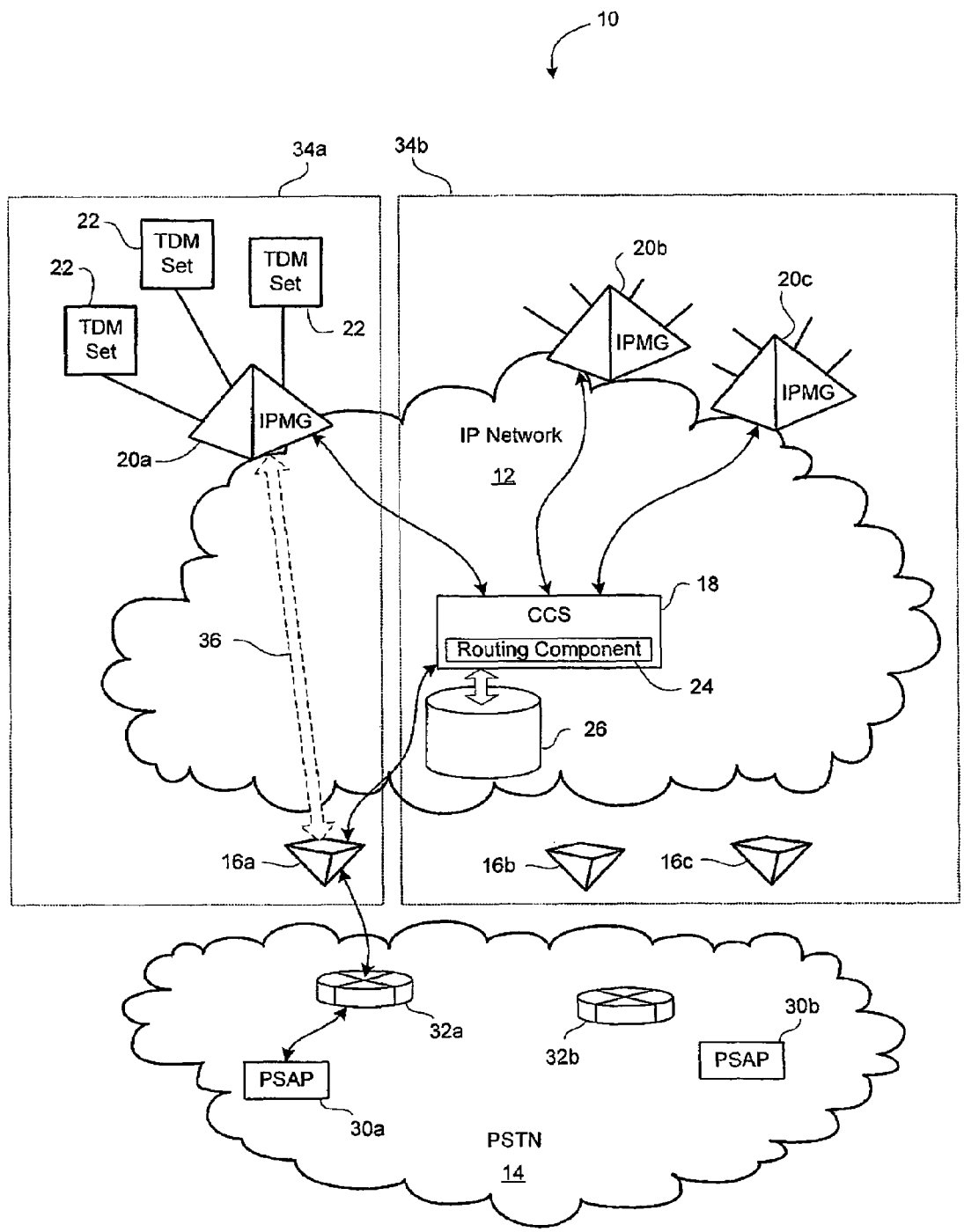
FIG. 1 diagrammatically shows a telecommunications system, including an IP network and a public switched telephone network.

Reference is first made to FIG. 1, which diagrammatically shows a telecommunications system 10 including an IP network 12 and a public switched telephone network (PSTN) 14. Edge gateways 16 (shown individually as 16a, 16b, and 16c) couple the IP network 12 to various different points of the PSTN 14. The PSTN 14 and the IP network 12 may be spread over a broad geographic region and may be located in more than one city, state and/or country. Accordingly, the edge gateways 16 may be located in different geographic regions. For example, a first edge gateway 16a may be located in one city, while a second edge gateway 16b may be located in another city.

A central call server (CCS) 18 is located within the IP network 12. The central call server 18 controls a number of IP media gateways (IPMGs) 20 (shown individually as 20a, 20b, and 20c). The IPMGs 20 each couple a plurality of devices to the IP network 12. The IPMGs 20 provide an interface for digital or analog devices to connect to the IP network 12. An IPMG 20 typically connects a number of TDM sets 22 to the IP network 12 and is co-located with the TDM sets 22 in a common physical location. For example, in a business setting, an office may contain an IPMG 20 and a number of TDM sets 22, with each TDM set 22 being directly wired to the IPMG 20. An office location may contain more than one IPMG 20. For example, a large office may include an IPMG 20 for each floor or multiple IPMGs 20 for each floor if the number of users is sufficiently large or dispersed. The TDM sets 22 may include traditional digital or analog telephone sets.

An enterprise may include a number of IPMGs 20 for interfacing a large number of TDM sets 22, all controlled by the central call server 18. The central call server 18 need not be located in the same geographic area as each IPMG 20. The central call server 18 uses the IP network 12 and IP messaging to interact with and control the IPMGs 20. The central call server 18 may provide a number of centralized control functions or applications, including call management and routing, voice mail applications, interactive voice response (IVR) applications, recorded announcement (RAN) applications, music-on-hold (MOH) applications, and other applications. In particular, the central call server 18 provides routing for calls originating from a TDM set 22 connected to one of the IPMGs 20. When a user originates a call using one of the TDM sets 22, the corresponding IPMG 20 to which the TDM set 22 is wired passes signalling information onto the central call server 18, including the number dialed by the user. The central call server 18 manages the set-up and routing of the call, including set-up of an IP trunk 36. In particular the central call server 18 sends the IPMG 20 routing information specifying the IP trunk 36 on which the IPMG 20 is to send media packets. This information may include an edge gateway 16 to connect the call to the PSTN 14 if the call is intended for a termination point external to the IP network 12. Signalling and control communications continue to pass through the central call server 18. Those of ordinary skill in the art will be familiar with the roles and functions of the IPMGs 20 and the central call server 18 in setting-up and managing calls.

The central call server 18 includes a routing component 24 for receiving signalling information from the IPMGs 20 regarding outgoing call requests, and for determining the routing information. The routing component 24 may interact with a routing database 26 containing routing data to enable the routing component 24 to determine appropriate routing instructions. Routing instructions are communicated to an IPMG 20 by the central call server 18 over the IP network 12. The routing component 24 may be made of up of a number of subcomponents for implementing its functions. It may be implemented by way of a suitably programmed processor operating under program control. Those of ordinary skill in the art will appreciate the possible mechanisms for implementing the routing component(s) 24 to provide for the functions of identifying, selecting, and routing described below.

In one embodiment, the central call server 18 is located in the same geographic area as one or more of the IPMGs 20, with additional IPMGs 20 in remote locations. For example, in an enterprise setting, the main office may contain the central call server 18 and a number of IPMGs 20. A number of other IPMGs 20 may be located in branch offices elsewhere on the enterprise campus, elsewhere in the city, or even in other states or countries. The IP network 12 interconnects the remote IPMGs 20 and the central call server 18 at the main office location.

In one embodiment, the PSTN 14 includes a number of public service answering points (PSAP) 30 (shown individually as 30a and 30b). Switches 32 (shown individually as 32a and 32b) within the PSTN 14 recognize incoming emergency service calls and are configured to route those calls to an associated PSAP 30. In general, a switch 32 routes an emergency service call to a designated PSAP 30 located in the same geographic location as the switch 32. When an emergency call is placed within the PSTN 14, it first reaches a switch 32 in the general geographic area from where the call originated. In other words, when a residential consumer places an emergency 911 call over the traditional phone network, the call is first terminated at a local branch exchange where the call is recognized by the exchange as an emergency 911 call and is routed or connected to the local PSAP 30. Accordingly, the caller is routed to a local PSAP 30 which will be appropriately equipped to respond to the emergency call.

With the proliferation of VoIP networks and distributed IP telephony, the routing of emergency calls to an appropriate PSAP 30 poses a difficulty. The caller is not necessarily in the same location as the central call server 18. Accordingly, if the central call server 18 routes an emergency call to an edge gateway 16 in its local area, the PSAP 30 reached in the PSTN 14 may not be an appropriate PSAP 30 for the caller. In some cases, the PSAP 30 may be located in a different city or country from the caller.

The central call server 18 needs to be able to route an emergency service request to an appropriate region of the PSTN 14 in order for the call to reach an appropriate PSAP 30. Accordingly, the central call server 18 associates each IPMG 20 with a geographic area or zone 34 (shown individually as 34*a* and 34*b*). Each geographic zone 34 may include more than one IPMG 20. Similarly, the central call server 18 associates each geographic zone 34 with one or more edge gateways 16. The associations between IPMGs 20 and their corresponding geographic zones 34 may be stored as routing data in the routing database 26.

When an emergency call is placed by one of the TDM sets 22, the central call server 18 recognizes the nature of the call and the routing component 24 determines the geographic zone 34 associated with the IPMG 20 to which the TDM set 22 is connected. Based on the identified geographic zone 34 the central call server 18 selects an edge gateway 16 to which the call will be routed in order to reach the PSTN 14. It communicates the routing instructions to the IPMG 20 and the call is routed to the appropriate edge gateway 16 and into the PSTN 14. Once in the PSTN 14 it reaches a switch 32 and is routed to the local PSAP 30.

If a geographic zone 34 is associated with more than one edge gateway 16, then the routing component 24 selects one of the edge gateways 16. The selection may be based upon a number of factors including quality-of-service assessments, load balancing, or other network considerations. A geographic zone 34 may have more than one edge gateway 16 so as to provide a zone of the IP network 12 with redundant connections to the PSTN 14 for reliability and quality-of-service reasons. Accordingly, if one of the edge gateways 16 is off-line, the central call server 18 may direct the emergency call to the other edge gateway 16.

Figure 2:
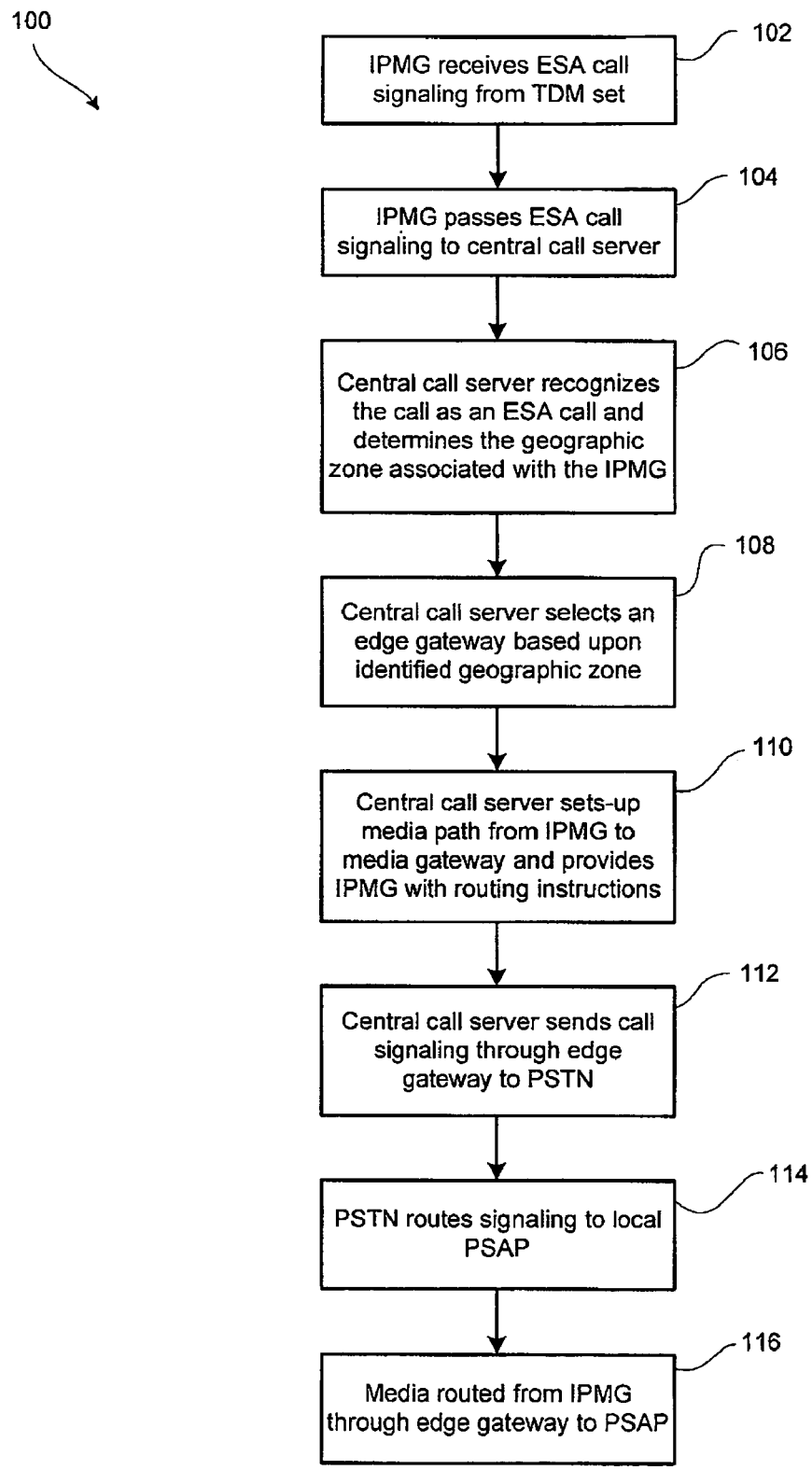
FIG. 2 shows, in flowchart form, a method of routing a call from a TDM set in an IP network.

Reference is now made to FIG. 2, which shows, in flowchart form, a method 100 of routing calls from TDM sets in an IP network. The method 100 begins in step 102 wherein an IPMG receives an ESA call from a TDM set. The IPMG passes the call signalling to a central call server in step 104. In step 106, the central call server recognizes, typically based upon the digits dialed, i.e. 911, that it has received a request for emergency services from a TDM set. Accordingly, the central call server determines the geographic zone or region associated with the IPMG from which it received the call signalling. It may do so by consulting a stored set of associations in a routing database. Based upon the identity of the IPMG, the central call server is able to determine its associated geographic zone.

In step 108, the central call server uses the determined geographic zone to select an appropriate edge gateway connecting the IP network to the PSTN. The central call server may select the edge gateway from more than one appropriate candidate edge gateways. It may also test the status or loading of the candidate edge gateways to ensure that the identified edge gateway is capable to handling the ESA call and connecting the user with the PSTN.

In step 110, having identified an edge gateway, the central call server performs the functions necessary to set-up an IP trunk between the IPMG and the selected edge gateway. The IPMG is provided with routing instructions to enable it to send media packets to the edge gateway directly.

In step 112, the central call server sends call signalling information through the selected edge gateway into the PSTN in order to set-up a circuit for the call. The PSTN receives the call signalling at a local switch and routes the call to the local PSAP in step 114. Once the circuit is established between the selected edge gateway and the PSAP, the call set-up is complete and the IPMG sends media to the selected edge gateway and through to the local PSAP. The user is thus connected with his or her local PSAP in order to receive appropriate emergency services.

The present application may be embodied in other specific forms without departing from the spirit or essential characteristics thereof. Certain adaptations and modifications of the above described embodiments will be obvious to those skilled in the art. Therefore, the above discussed embodiments are considered to be illustrative and not restrictive, the scope of the application being indicated by the appended claims rather than the foregoing description, and all changes which come within the meaning and range of equivalency of the claims are therefore intended to be embraced therein.

What is claimed is:

1. A method of routing a call request from a time-division multiplexed (TDM) set, the TDM set being connected to an IP network through an IP media gateway, the IP network including a central call server for controlling the IP media gateway and routing calls in the IP network, the IP network including a plurality of edge gateways connecting the IP network to a public switched telephone network (PSTN), the method comprising the steps of:
   receiving a signalling message at the central call server from the IP media gateway, said signalling message identifying a call from the TDM set;
   identifying a geographic zone associated with the IP media gateway;
   selecting one of the edge gateways based upon said geographic zone; and
   sending the IP media gateway routing information for routing said call to said selected edge gateway.

2. The method claimed in claim 1, wherein the IP network includes a plurality of IP media gateways and more than one geographic zone, and wherein said method further comprises a step of associating each of the plurality of IP media gateways with one of said geographic zones.

3. The method claimed in claim 2, wherein each of said geographic zones has at least one associated edge gateway.

4. The method claimed in claim 3, wherein said step of selecting one of the edge gateways includes testing the functionality of said at least one associated edge gateway.

5. The method claimed in claim 3, wherein said central call server includes a routing database, and wherein said routing database includes said associations between each of the plurality of IP media gateways and one of said geographic zones.

6. The method claimed in claim 5, wherein said step of identifying includes reading said routing database to determine said geographic zone associated with the IP media gateway.

7. The method claimed in claim 1, wherein the IP media gateway is remote from the central call server.

8. The method claimed in claim 1, wherein the method includes a step of receiving the call request at the IP media gateway from the TDM set and composing said signalling message.

9. The method claimed in claim 1, wherein said call comprises an emergency services access call, wherein the PSTN includes a switch and a public service answering point, and wherein said selected edge gateway routes said emergency services access call to said switch, and wherein said switch routes said emergency services access call to said public service answering point.

10. The method claimed in claim 1, wherein said step of sending the IP media gateway routing information includes establishing an IP trunk between the IP media gateway and said selected edge gateway.

11. A system for routing a call request from a time-division multiplexed (TDM) set through an IP network, the IP network including a plurality of edge gateways connecting the IP network to a public switched telephone network (PSTN), the system comprising:
- an IP media gateway connected to the TDM set and providing an interface to the IP network; and
- a central call server for controlling said IP media gateway and routing calls in the IP network, said central call server including an input for receiving a signalling message from said IP media gateway, said signalling message identifying a call from the TDM set, and said central call server including
- a component for identifying a geographic zone associated with said IP media gateway,
- a component for selecting one of the edge gateways based upon said geographic zone, and
- a component for sending routing information to the IP media gateway for routing said call to said selected edge gateway.

12. The system claimed in claim 11, wherein the IP network includes a plurality of IP media gateways and more than one geographic zone, and wherein said central call server includes a routing database containing routing data associating each of the plurality of IP media gateways with one of said geographic zones.

13. The system claimed in claim 12, wherein said component for identifying a geographic zone reads said routing database.

14. The system claimed in claim 12, wherein said routing data includes an association between each of said geographic zones and at least one associated edge gateway.

15. The system claimed in claim 14, wherein said component for selecting one of the edge gateways includes a component for testing the functionality of said at least one associated edge gateway.

16. The system claimed in claim 11, wherein said IP media gateway is located remote from said central call server.

17. The system claimed in claim 11, wherein said IP media gateway includes an input for receiving the call request at the IP media gateway from the TDM set and an IP messaging component for composing said signalling message.

18. The system claimed in claim 11, wherein said call comprises an emergency services access call, wherein the PSTN includes a switch a public service answering point, and wherein said selected edge gateway routes said emergency services access call to said switch, and wherein said switch routes said emergency services access call to said public service answering point.

19. The system claimed in claim 11, wherein said component for routing includes a component for establishing an IP trunk between said IP media gateway and said selected edge gateway.

20. A central call server for routing a call request from a time-division multiplexed (TDM) set through an IP network, the IP network including a plurality of edge gateways connecting the IP network to a public switched telephone network (PSTN), the IP network including an IP media gateway connected to the TDM set and providing an interface to the IP network, the central call server comprising:
- an input for receiving a signalling message from said IP media gateway, said signalling message identifying a call from the TDM set;
- a component for identifying a geographic zone associated with said IP media gateway;
- a component for selecting one of the edge gateways based upon said geographic zone; and
- a component for sending routing information to the IP media gateway for routing said call to said selected edge gateway.

21. The central call server claimed in claim 20, wherein the IP network includes a plurality of IP media gateways and more than one geographic zone, and wherein the central call server includes a routing database containing routing data associating each of the plurality of IP media gateways with one of said geographic zones.

22. The central call server claimed in claim 21, wherein said component for identifying a geographic zone reads said routing database.

23. The central call server claimed in claim 21, wherein said routing data includes an association between each of said geographic zones and at least one associated edge gateway.

24. The central call server claimed in claim 23, wherein said component for selecting one of the edge gateways includes a component for testing the functionality of said at least one associated edge gateway.

25. The central call server claimed in claim 20, wherein said call comprises an emergency services access call, wherein the PSTN includes a switch and a public service answering point, and wherein said selected edge gateway routes said emergency services access call to said switch, and wherein said switch routes said emergency services access call to said public service answering point.

26. The central call server claimed in claim 20, wherein said component for routing includes a component for establishing an IP trunk between said IP media gateway and said selected edge gateway.

* * * * *